Feb. 4, 1930.  H. F. KURTZ  1,746,083
LIGHT ANALYSIS APPARATUS
Filed June 28, 1926   6 Sheets-Sheet 3
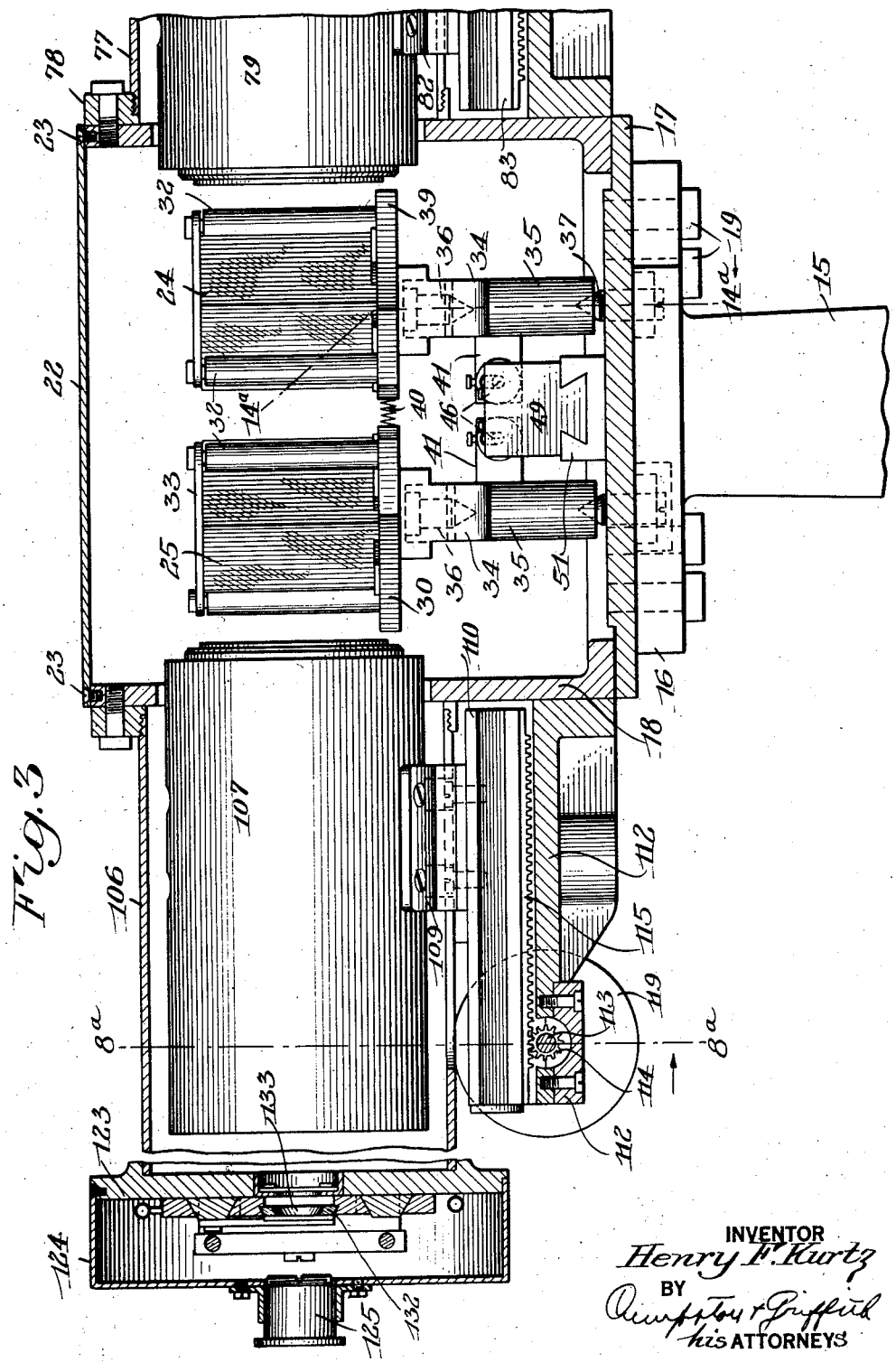
INVENTOR
Henry F. Kurtz
BY
his ATTORNEYS

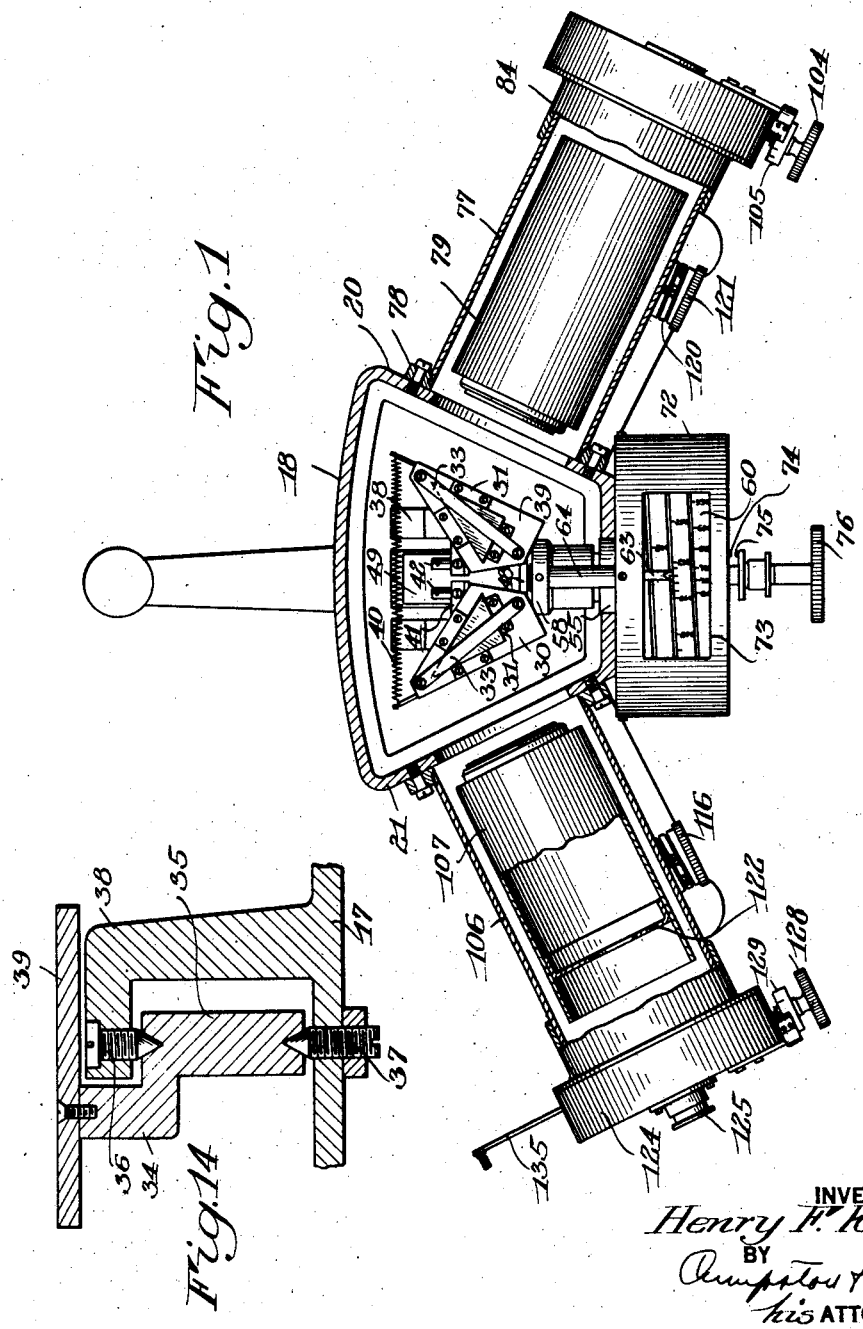

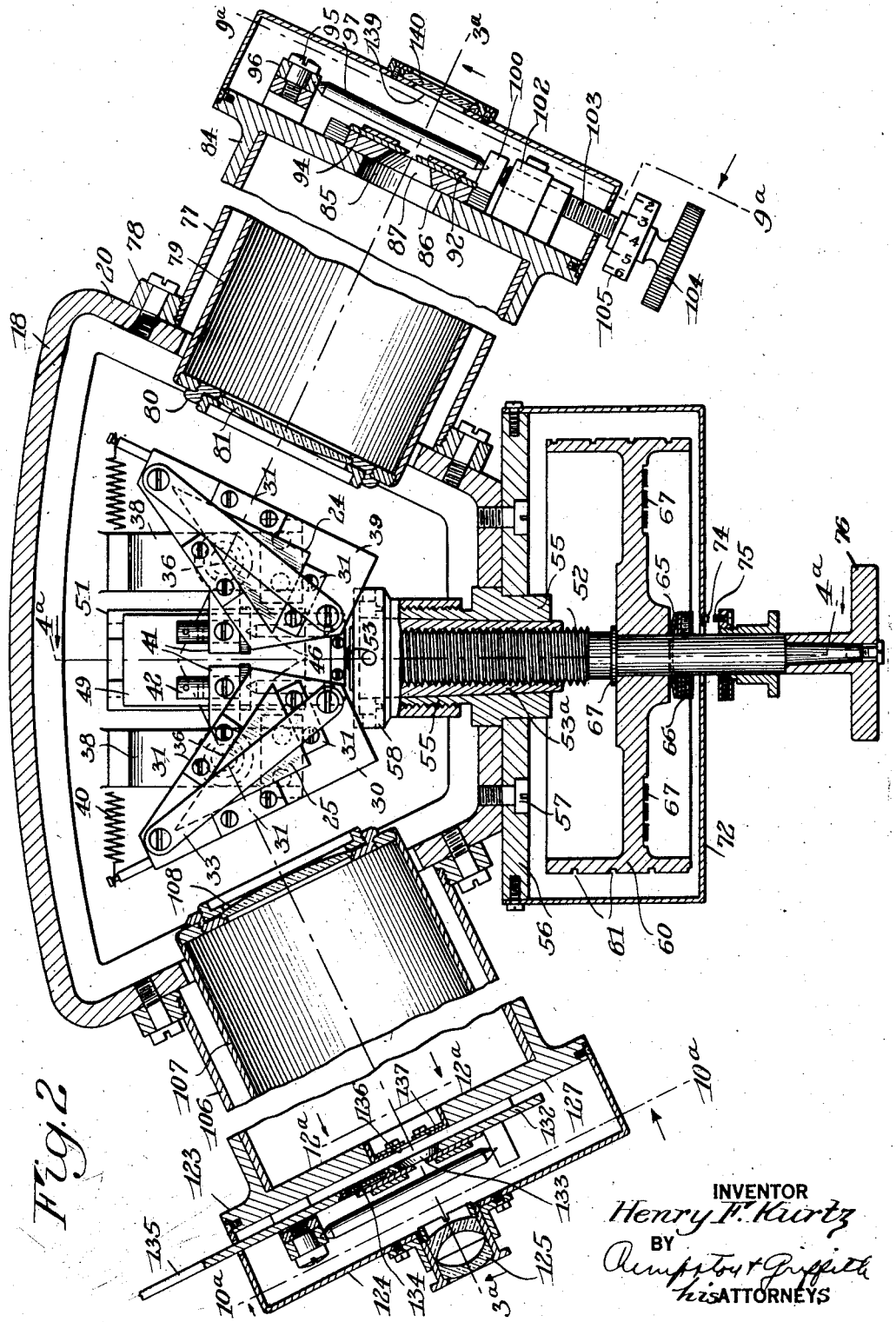

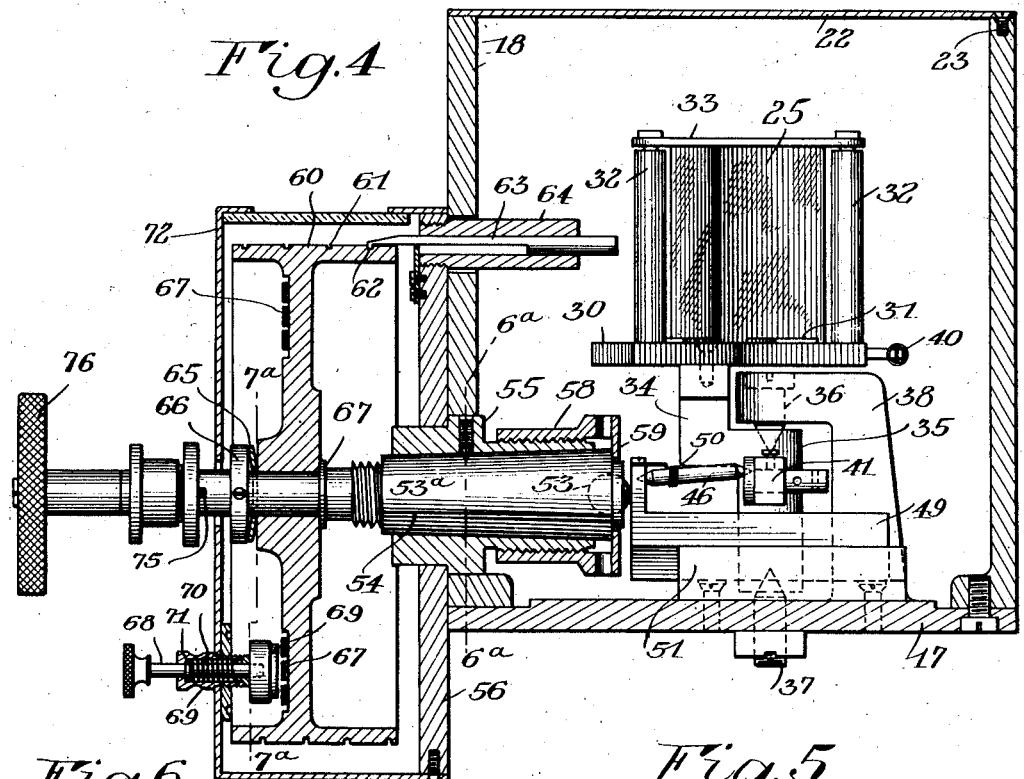
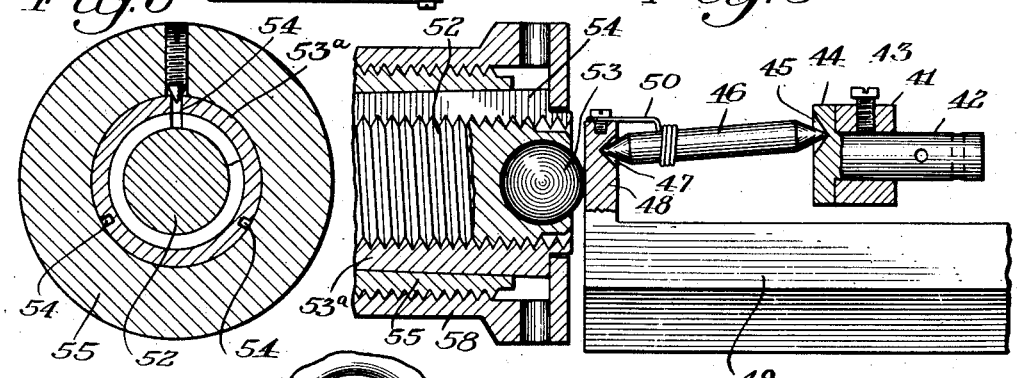
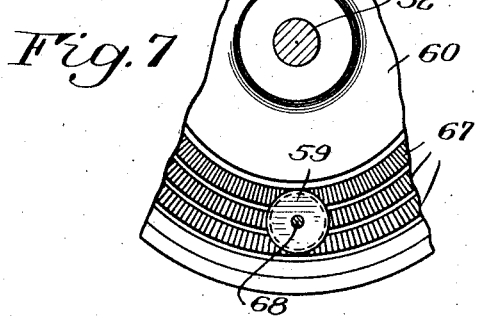

Feb. 4, 1930.  H. F. KURTZ  1,746,083
LIGHT ANALYSIS APPARATUS
Filed June 28, 1926    6 Sheets-Sheet 5

INVENTOR
Henry F. Kurtz
BY
his ATTORNEYS

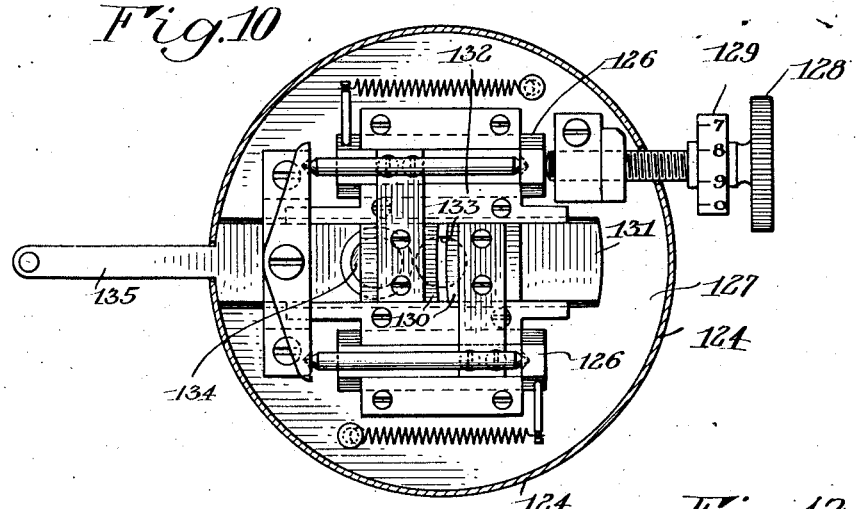
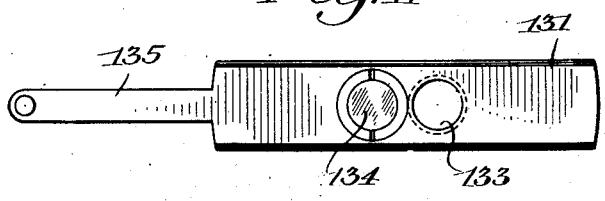
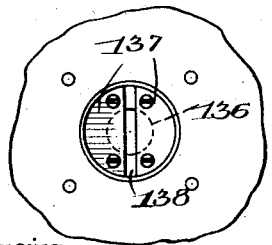
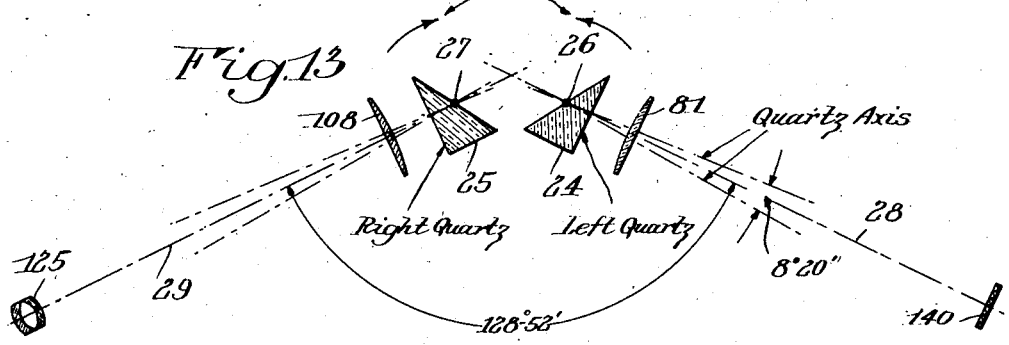

Patented Feb. 4, 1930

1,746,083

UNITED STATES PATENT OFFICE

HENRY F. KURTZ, OF ROCHESTER, NEW YORK, ASSIGNOR TO BAUSCH & LOMB OPTICAL COMPANY, OF ROCHESTER, NEW YORK, A CORPORATION OF NEW YORK

LIGHT-ANALYSIS APPARATUS

Application filed June 28, 1926. Serial No. 118,920.

This invention relates to light analysis apparatus of the variety employing a dispersing prism system adapted for use, for example, for spectroscoptic, spectrometric or spectrographic purposes, or as a source of light of predetermined wave length, such as monochromatic light. One object of the invention is to provide an improved dispersing prism system in a form of construction convenient in use, efficient in its optical properties and practical and economical from a manufacturing standpoint. Another object is to provide such a prism system of the constant deviation type in which the axes of the incident and dispersed light have a fixed angular relation to each other and thus facilitate the use of a definite wave length scale. Another object is the provision of such a prism system, comprising two or more prism elements arranged so that the light is refracted directly from the axis of incidence to the axis of dispersion without reflection and the consequent waste of light and so that the corresponding surfaces of the prism elements are inclined to each other to eliminate reflection images and stray light. Another object is to provide a prism system of the above character adapted for the use of prism elements of birefracting material of relatively small size and economical with respect to the cost of material and the conservation of light. Another object is the provision of such a prism system comprising prism elements of birefracting material arranged to afford equal path lengths of right and left hand material to minimize doubling of the spectrum. A further object is to provide such a system of relatively high light gathering power combined with a minimum of internal reflections and stray light and light wastage. Still a further object is to provide a simple, practical and convenient form of instrument for utilizing a prism system of the above character in which the optical elements and moving mechanical parts are enclosed and protected against disturbance and dirt; in which the prism system and other parts are conveniently accessible for removal and replacement; in which separate optical systems are employed for the incident and dispersed light to increase the range of usefulness and convenience in use of the instrument. Further objects are to provide such an instrument with a simple and efficient form of mounting and adjustment for the prism elements, of rugged but accurate prism adjusting means in the form of a wave length screw, of conveniently visible prism adjusting means embodied in a large wave length drum engraved with large figures convenient to read and of a durable and effective slit mechanism.

To these and other ends the invention resides in certain improvements and combinations of parts, all as will be hereinafter more fully described, the novel features being pointed out in the claims at the end of the specification.

In the drawings:—

Figure 1 is a plan view partly in section of an instrument embodying the present invention;

Figure 2 is an enlarged view similar to Figure 1 but with other parts shown in section and arranged to more clearly illustrate the construction;

Figure 3 is a sectional elevation substantially on the line 3ª—3ª in Figure 2;

Figure 4 is a sectional elevation substantially on the line 4ª—4ª in Figure 2;

Figure 5 is an enlarged sectional elevation of parts shown in Figure 4;

Figure 6 is an enlarged sectional elevation substantially on the line 6ª—6ª in Figure 4;

Figure 7 is a fragmentary enlarged elevation substantially on the line 7ª—7ª in Figure 4;

Figure 10 is a sectional elevation substantially on the line 10ª—10ª in Figure 2;

Figure 11 is an elevation of parts shown in Figure 10, detached;

Figure 12 is an elevation of a fixed aperture device substantially as seen from line 12ª—12ª in Figure 2;

Figure 13 is a schematic diagram of the optical system; and

Figure 14 is an enlarged sectional elevation substantially on the line 14ᵃ—14ᵃ in Figure 3.

Similar reference numerals throughout the several views indicate the same parts.

Figure 8:
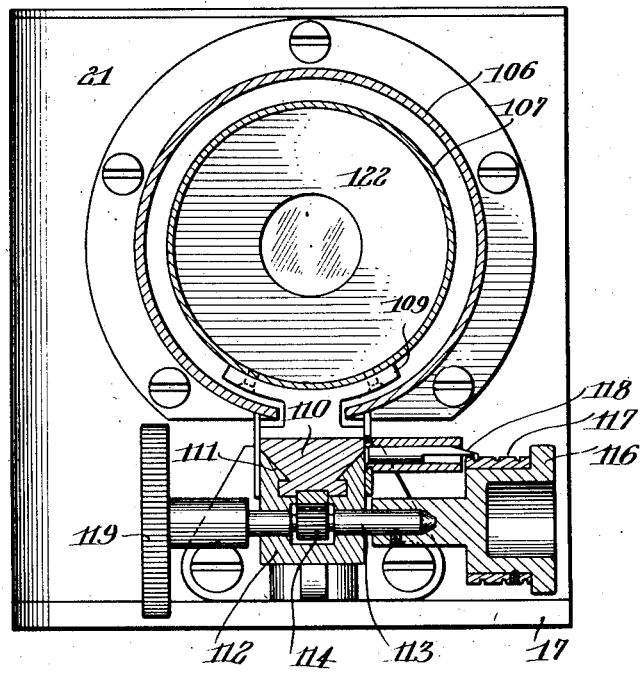
Figure 8 is a sectional elevation on the line 8ª—8ª in Figure 3.

The invention is disclosed herein by way of illustration as applied to an instrument for producing monochromatic light and commonly known as a monochromator. The present apparatus is of the constant deviation type, that is, one in which the axes of the incident and dispersed light, or in other words, of the collimator and telescope or camera or corresponding part, are arranged in fixed angular relation to each other and the spectrum is made to traverse the observation point, i. e., the focus of the eye piece of a telescope or the plate in the camera, by rotation of a prism part or parts.

The present embodiment comprises, more specifically, a supporting column carrying at its upper end a prism box substantially in the form of hollow trapezoidal prism, which box encloses the prism system but has a removable cover affording access to the interior. The prism elements are mounted in the box on pivotally or rotarily adjustable tables and the front wall of the box carries a wave length screw and indicating scale in the form of a unitary assembly. The collimator and telescope are fixed to the opposite inclined sides of the box respectively with their axes at an angle to each other, corresponding to the constant angle of deviation of the instrument.

The supporting column for the instrument is shown at 15 (Figure 3) and rests upon a tripod or other suitable base (not shown). The upper end of the column is formed with a head 16 to which the bottom 17 of the prism box 18 is secured as by means of screws 19. The prism box has the shape substantially of a trapezoidal prism as best shown in Figures 1 and 2 with inclined opposite sides 20 and 21 to which the collimator and telescope respectively are fixed as more particularly described hereafter. The prism box is provided with a cover plate 22 detachably secured thereon as by means of screws 23 to afford convenient access to the prism system.

The prism system comprises a pair of prism elements mounted in the prism box for adjustment relative to one another in accordance with the wave length of light to be employed. These elements, as shown diagrammatically in Figure 1, are preferably prisms of equal refracting angles and mounted for simultaneous rotary or pivotal adjustment in opposite directions. The prism angles may be of any desired or convenient magnitude, selected to function in accordance with the predetermined conditions. This angle will usually be of the order of 20° to 40°, but is not limited to this range, and in the present embodiment is 30°. As already stated the present instrument is of the constant deviation type and the prism system is interposed between the relatively fixed collimator and telescope axes. Thus in Figure 13 the prism elements are shown at 24 and 25 being supported as more fully described hereafter for rotation about vertical axes 26 and 27, respectively, passing through the hypothenuse of each prism. At 28 is the collimator axis and at 29 the axis of the telescope, these axes being relatively fixed with a suitable included angle, which is selected in accordance with the wave length range of the instrument. That is, for a given selected wave length range the prism angles are chosen according to experience. Then by calculation the angular location of the extremes of the spectrum and the angle between the telescope and collimator are found. The angles are then changed and the calculation performed again until a disposition is found which permits equal rotation of the prisms, clockwise and counterclockwise, to move the extremes of the desired spectrum before the telescope index. Thus the angle between the collimator and telescope axes and the angles of the prisms may be so chosen that each of the back surfaces of the prisms departs equally, clockwise and counterclockwise, from perpendicularity to the optical axes of the telescope and collimator. This is one arrangement which has been found satisfactory in the present application of the invention, but it is to be understood that the invention is not limited to this particular embodiment and that the prism system can be designed to meet any preconceived condition, in this respect, within the limits imposed by the laws of optics.

The prisms in the present instance are made of birefracting material or quartz and the quartz axis is so chosen that it is parallel to the optical axis of the instrument when the prisms are set for the wave length of the center of the spectrum. That is, the position from which the two prisms rotate symmetrically. When the axes are so chosen, the doubling of the lines in the spectrum is a minimum. For instance, in the case of a quartz monochromator constructed in accordance with these conditions, the doubling is 0° 1' 10" at the extremes of the spectrum and zero at the center of it where the range is 2000 A. units to 8000 A. units. This amount of doubling, for many purposes, is of no practical consequence.

Of the two prism elements, one is preferably made of right hand and one of left hand quartz. When the prisms are normal to the telescope and collimator axes, the system is arranged to transmit light of a wave length of 2000 A. so that reflection losses are a minimum at this wave length. It is also found that in this arrangement in which the respective refracting surfaces of the prisms are inclined to one another, trouble due to reflected images and to stray light is reduced to a minimum.

Under the particular conditions of this apparatus the angle between the collimator and telescope axes or the constant angle of deviation of the instrument is 128° 52'. The quartz optic axes are so located that when the prisms are at the center of rotation, the light within the prisms is passing parallel to the respective axes. The result is zero doubling at the center of the spectrum and equal but opposite doubling at the extremes. The image formed by the extraordinary ray is 0° 1' 10'' to the right of that formed by the ordinary ray at 8000 A., the two images are coincident at about 2700 A. or at the center of the spectrum and the image formed by the extraordinary ray is 0° 1' 10'' to the left of that formed by the ordinary ray at 2000 A., this amount of doubling being of little consequence.

For the purpose of obtaining high light gathering power, it is desirable to push the relative aperture of the objectives to the highest limit. It is quite possible to correct objectives to work satisfactorily at an aperture ratio of $f:4.5$ by using two separate elements but this means four reflecting surfaces in each objective with attendant reflection image difficulties and high reflection losses, not to mention the additional quartz required. By using aspheric surfaces, it has been found possible to make objectives of a single piece of quartz working at $f:4.0$ for 2000 A. and at $f:4.9$ for 8000 A. with excellent definition.

It is to be noted that by a prism system such as described the light is deviated exclusively by refraction, directly from the axis of the incident light or of the collimator to the axis of the dispersed light or of the telescope, without the use of reflecting surfaces, such as mirrors, with their attendant disadvantages of selective reflection and absorption of light in respect to wave length and deterioration with time. Such a prism system furthermore permits of the use of relatively small pieces of refracting material, as desirable, to reduce waste of light and expense in manufacture. Moreover, such a prism system imposes no limitations of aperture on the apparatus with which it is used and it is adapted for use with a separate collimator and telescope, camera or the like with relatively fixed axes, a feature of great convenience in many uses. Thus with conveniently stationary axes for the collimator and telescope, the adjustment of the instrument is effected by simple rotation of the prism elements which is readily accomplished by a simple device, such as a screw provided with an indicating wave length scale as more fully described hereafter.

The means for mounting the prism elements comprises preferably a table for each which are of the same construction so that but one needs be described. Thus prism 25 is mounted on a table 30 (Figures 2, 3 and 4) the top of which is provided with abutments or cleats 31 for the respective sides of the prism so that the latter is definitely positioned on the table with the center of its hypothenuse face in alignment with the axis on which the table is mounted to rotate as hereafter described. The table carries spaced posts 32 to the upper ends of which a strap 33 is detachably secured by screws for holding the prism on the table between its cleats. By this means each prism is securely held in position but may be readily removed for cleaning or replacement.

Each prism table is carried on a bracket 34, (Figure 4) rising angularly from a cylinder 35 provided at its opposite ends with center bearings for engagement with upper and lower center screws 36 and 37, respectively. Center screw 36 depends from the upper end of a bracket 38 fixed on the bottom 17 of the prism box, while screw 37 extends through the bottom of the box, being accessible externally of the latter for conveniently adjusting the play of the bearing. This supporting means for the prism tables provides for removal of the prisms for cleaning and replacement without the need for a long and tedius readjustment and serves also to eliminate the cone type of bearing heretofore commonly used and which has frequently been the source of erratic behavior and annoyance.

The other prism 24 is mounted, as stated, on a similar table 39, these tables being located, as shown, for positioning the prisms carried thereby in accordance with the optical principles described above. The means for effecting pivotal adjustment of the prism elements comprises preferably a tension spring 40 secured at its ends to the respective tables for rotating the same in one direction, and a device provided with a wave length scale for rotating the prism tables in the opposite direction against the tension of spring 40. This adjusting device in the present instance is in the form of a screw forming part of a unitary assembly secured to the front wall of the prism box. This prism adjusting device comprises an arm 41 on each table bearing portion 35, these arms projecting towards each other transversely of the pivotal axes and each carrying a spindle 42 rotating in the arm with a set screw 43 for securing the same in adjusted position. Each spindle carries a head 44 formed eccentrically of the spindle with a bearing recess or socket means 45, which latter therefore may be adjusted toward and from the pivotal axis of the corresponding table to vary the operating length of the arm 41. Engaged at one end in each socket 45 is a conically pointed pin 46, the other end of which is engaged in a similar socket means 47 in a lug 48 on a slide 49 movable in guides on the bottom 17 of the prism box. Each pin 46 is preferably supported against displacement by a spring 50 wound at one end about the pin and secured at the other on slide lug 48. Slide 49 has a dove-tail underside engaging with a correspondingly formed way in a block 51 fixed on the prism box. It is thus apparent that by moving slide 49 the prisms may be rotated in clockwise and counterclockwise directions respectively, and that the degree of rotation of each prism may be adjusted by adjusting the position of the spindle head 44 relative to the pivotal axis of the corresponding table. It will be seen also that spring 40 tends to rotate the prism tables and arms 41 thereon against the pins 46 and the latter against the head 48 of the slide to maintain these connections in cooperating contact and also to maintain the slide in contact with the means for adjusting the same. The means for moving the slide 49 comprises a unitary wave length screw assembly carried on the front wall of the prism box. The screw proper is shown at 52 having rotatably mounted in its inner end a ball 53 for frictionless engagement with the slide 49. The screw turns in an elongated nut 53ª, which is slit longitudinally for the greater portion of its length as indicated at 54 (Figures 5 and 6). The outer surface of the nut is tapered as shown and has a slight longitudinal sliding movement in a sleeve 55 mounted in a plate 56 secured as by means of screws 57 to the front wall of the prism box, which latter is formed with an opening through which these portions project. The sleeve 55 is externally threaded at its inner end to receive an adjusting nut 58 having a portion 59 for engagement with the end of the nut 53ª to force the same through sleeve 55 to contract the nut 53ª on the threads of the wave length screw 52 for the purpose of taking up any looseness in the mounting of the screw. The screw and its nut are of relatively large diameter and of coarse pitch threading to assure durability.

The wave length screw 52 has adjustably mounted thereon an indicating drum 60, the periphery of which is provided with a helically arranged wave length scale as shown in Figure 1. This arrangement provides for a scale of extended length and consequently with readily visible graduations and figures to facilitate accurate adjustments. The surface of the drum along the line of the scale is provided with a groove 61 in which engages and slides the hooked end 62 of a pointer or index 63, which slides longitudinally in a sleeve 64 fixed in the part or plate 56 carrying the wave length screw assembly. It will be seen that as the drum is turned, the index 63 slides longitudinally to follow the axial movement of the line of the scale. Drum 60 is yieldably connected to the wave length screw by a spring washer 65 between the hub of the drum and a collar 66 fixed on the screw, the drum being thus pressed against a shoulder 67 on the screw so that it normally rotates with the latter. For the purpose, however, of adjusting or readjusting the indication of the drum to the positions of the prisms, means are provided for temporarily holding the drum stationary while the wave length screw is turned until the indication of the drum corresponds with the position of the prisms. Such means comprises a corrugated bearing surface 67 extending circumferentially of the drum and a spindle 68 having a friction head 69 adapted to be pressed against the surface 67 of the drum to hold the latter. Spindle 68 slides in a sleeve 69 and a spring 70 coiled about the spindle in the sleeve bears at one end against a shoulder 71 on the spindle and normally maintains the latter out of engagement with the drum in inactive position.

The spindle and indicating means are preferably enclosed and protected by a housing indicated generally at 72 (Figure 4), which protects these parts from injury and the collection of dirt, the upper portion of the cylindrical wall of the housing being formed with a glazed window 73 (Figure 1) through which the indicating surface of the drum 60 is clearly visible. The wave length screw extends through the front wall of housing 72 which latter carries a stop 74. The screw is provided with a stop 75 for cooperation with stop 74 to limit the rotation of the screw in one direction. The screw is equipped at its forward end with a substantial knurled disk 76 by which it may be conveniently rotated to move slide 49 and rotate the prisms. It will be noted that the adjustment of the screw in one direction is limited by the stops 74 and 75, while adjustment of the screw in the opposite direction merely withdraws its inner end from slide 49, the movement of which under actuation of the spring 40 is stopped by the adjusting nut 58 so that these parts cannot be injured by excessive turning of the wave length screw.

The collimator and telescope are fixed on and project perpendicularly from the opposite inclined sides 20 and 21 of the prism box, these sides being suitably inclined to each other for this purpose.

The collimator comprises preferably a tube 77 of relatively large diameter threaded at its inner end within a ring 78 on the wall of the prism box (Figures 1, 2 and 3). This tube houses the adjustable objective means and also carries at its outer end a suitable slit mechanism as hereafter described.

The collimator objective comprises a tube 79 sliding longitudinally in spaced relation within tube 77 and having at its inner end (Figure 2) a suitable mounting 80 of the usual or any suitable variety for a single quartz lens 81 of aspheric surface formation of 150 mm. focus for sodium light and of 31 mm. free aperture, giving an aperture ratio of $f:4.0$ for 2000 A. and $f:4.9$ for 8000 A. The mounting tube 79 is carried on a bracket 82 (Figure 3) extending through a longitudinal slot in tube 77 and fixed to a rack and pinion slide 83, which latter is also supported on a prism box for effecting focusing adjustment of the objective. This adjusting mechanism is of the same construction as that provided for and more fully described hereafter in connection with the telescope objective so that the description of the latter will suffice for this common feature of both objectives.

Figure 9:
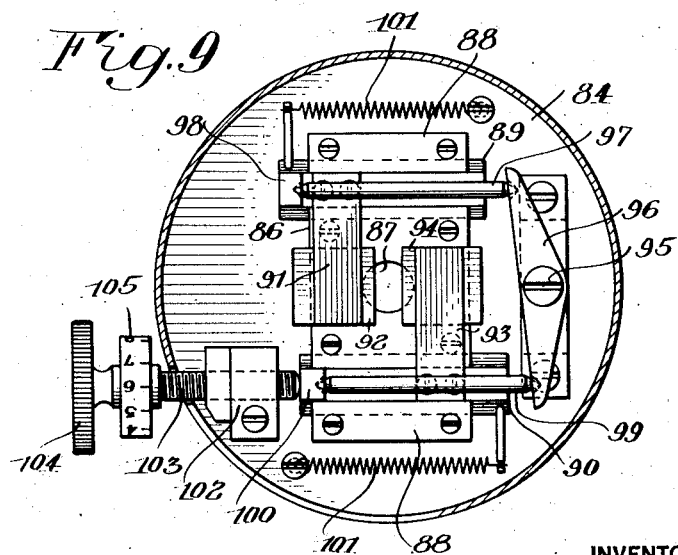
Figure 9 is a sectional elevation substantially on the line 9ª—9ª in Figure 2.

The collimator slit mechanism is mounted on a head 84 which closes the outer end of tube 77 except for an opening 85 in the head on the optical axis. This mechanism is shown in Figure 9 as comprising a plate 86, screwed to the outer side of head 84 and having therein an aperture 87 on the optical axis. Secured to head 84 and spaced from the opposite sides of plate 86 are strips 88, which latter and the adjacent edges of plate 86 are shaped to provide dove-tail guideways for a pair of spaced parallel slides 89 and 90. Slide 89 carries an arm 91 equipped with a slit edge 92. Slide 90 carries a similar arm 93 with a slit edge 94. Pivotally mounted on head 84 as at 95 is a lever 96, the ends of which are formed with bearing sockets. Fitting at one end into one of these sockets is a pin 97 the other end of which fits in a corresponding socket in a lug 98 on slide 89. Similarly a pin 99 fits at one end into the recess in the other end of lever 96, while the other end of this pin fits into a recess in a lug 100 on slide 90. Tension springs 101 secured to head 84 and to the respective slides tend to move the latter to bring slit edges 92 and 94 together to close the aperture 87, the movement of the slides being equalized by the connections with the lever 96.

At 102 on the head is a nut in which turns a screw 103, the inner end of which bears against the lug 100 of slide 90 in opposition to the action of the springs. Screw 103 has a knurled operating head 104 and is provided with an indicating drum 105 cooperating with a suitable index on the head. It is apparent from this construction that by adjusting screw 103 the slit opening may be varied as required and this mechanism provides an effective and reliable bilateral slit opening.

The present instrument being adapted for use as a monochomator is provided with a telescope comprising a tube 106 similar to the tube 77 and similarly fixed to the opposite wall of the prism box. Sliding longitudinally in spaced relation in tube 106 is an objective tube 107 of relatively large diameter corresponding to the collimator tube 79 and having mounted at its inner end an objective 108 of the character described in connection with the collimator objective. The tube 107 is mounted on a bracket 109 (Figures 3 and 8) fixed on a rack slide 110 sliding in a guideway 111 formed in a bracket 112 carried by the prism box. This bracket supports a rotary spindle 113 having a pinion 114 meshing with the rack 115 of the slide for adjusting the latter and the objective for focusing the same. Spindle 113 extends through the opposite sides of bracket 112 and has fixed on one end an operating knob 116, provided at 117 with a helically arranged wave length scale corresponding to the prism adjusting scale 60. At 118 is a sliding index operating as described in connection with the prism scale index 63. The other end of spindle 113 has an auxiliary knob 119 for rotating the same. The collimator is adjusted in a similar manner and by means of a similar indicating device having a wave length scale indicated at 120 and a knob 121 for rotating the same and the adjusting pinion. It is to be understood that with the prism system adjusted for a predetermined wave length, the knobs 116 and 121 are rotated to indicate the same wave length and thereby to properly focus the objectives. The telescope objective tube 107 is equipped with an apertured diaphragm 122 for trapping stray light rays and, if desired, both the collimator and telescope tubes may be so equipped, and with a plurality of such diaphragms instead of one. Such diaphragms and the large diameter of the optical tubes serve to trap and eliminate stray rays entering the tubes.

The telescope tube 106 is equipped at its outer end with a bilateral slit mechanism indicated generally at 123 in a housing 124 and the outer wall of the latter carries the eyepiece 125, which may be of the usual or any suitable construction. The telescope slit mechanism has the same construction as described above in connection with the collimator comprising as before the slides 126 (Figure 10) sliding in guideways on a similar head 127 and adjusted as by means of a screw having a knurled head or knob 128 provided with a scale 129 operating as previously described. The slit edges are shown at 130. This mechanism, however, includes an additional slide 131 moving longitudinally in guides formed in or between portions of a slit aperture plate 132 on the head. Slide 131 as shown in Figures 10 and 11 is provided with an aperture 133 and the slide is normally adjusted with this aperture in the optical axis. The present mechanism being intended for the use of normally invisible rays of the spectrum, means are provided for rendering such rays visible as useful, for example, in adjusting the prism system. To this end slide 131 is equipped with a disk 134 of uranium glass which fluoresces brightly in the ultra-violet, when the slide is moved to place this disk in the optical axis to thus render the light rays visible for the purpose stated. Slide 131 has a projecting handle 135 for adjusting the same. The aperture 136 in the head 123 for the telescope slit mechanism (Figures 2 and 12) is preferably limited by a pair of semicircular plates 137 having their adjacent edges separated to form a slit 138 equal to or slightly greater than the maximum slit required. The aperture 139 in the housing for the slit mechanism of the collimator is preferably closed by a thin quartz window 140.

In operation the instrument is arranged so that the collimator receives a beam of suitable light which is directed in parallel rays on to the prism system. The micrometer or wave length screw 52 is provided with the index 63, which corresponds with the center of the telescope slit. To adjust the prism system this screw is rotated to simultaneously rotate the prism elements clockwise and counterclockwise, respectively, so that the light is refracted successively by the prisms directly from the axis of the collimator to that of the telescope. Such adjustment of the prisms causes the spectrum to traverse the observation point. During the initial adjustment of the prism system, any chosen line, preferably one near the center of the spectrum, as shown by the index and indicating drum 60, is directed to the telescope slit, the latter and the collimator slit having been suitably adjusted by their micrometer screws. The uranium screen 134 is positioned in the optical axis by moving the handle 135 of the slide 131 and inspection is then made to ascertain if the spectrum line is properly positioned. If not the indicating wave length drum 60 is adjusted on the screw 52 by means of the brake spindle 68 until the indications of the drum correspond with the spectrum line positioned at the telescope slit. The slide handle 135 is then moved to withdraw the uranium screen and the eyepiece is removed for normal use of the instrument during which the telescope slit becomes the source of monochromatic radiation of the wave length indicated by the drum 60. The collimator and telescope objectives, of course, are focused by turning their micrometer adjusting screws to the same setting as the wave length drum.

The invention thus supplies a refracting prism system of a simple, convenient and inexpensive type, convenient to adjust and which functions with a high degree of optical efficiency, in combination with effective optical systems for the incident and deviated light. The simple adjustment of the prism elements with fixed axes for the incident and deviated light affords an exceedingly convenient arrangement for example, for co-ordinating the collimator with a source of light and the telescope, camera or other optical system for the deviated light with other apparatus or a definite position of use. The optical elements are combined with an efficient instrument structure by which the parts are enclosed and protected from disturbance in housings which are furthermore dustproof. The parts are radially accessible, the prisms being adjustably mounted by efficient means within the prism box and the screw, nut and indicating device for adjusting the same being advantageously constructed as a unitary assembly mounted on the prism box wall. The collimator and telescope systems are designed with effective objective means and with large diameter tubes for affording high light gathering power and eliminating stray light and they are equipped with a simple, accurate and reliable form of slit mechanism. The adjusting means for the prism systems, for focusing the objectives and for the slit mechanism are convenient and accessible and provided with indicating means having relatively large and clearly visible graduations and figures so that the instrument as a whole may be quickly, conveniently and accurately adjusted in use.

What I claim as my invention is:—

1. A light analysis apparatus comprising two relatively fixed optical systems and a dispersing prism system therebetween, said prism system comprising a plurality of prismatic elements, the respective refracting surfaces of which are arranged at an inclination to one another and movable simultaneously relative to one another to correspond with variation in the wave length of light to be employed.

2. A light analysis apparatus having the axes of the incident and emitted light at a constant angle, comprising a dispersing prism system including a plurality of prismatic elements of material transparent to ultra-violet light with relatively inclined refracting surfaces and movable relative to one another to symmetrical positions relative to said axes, in accordance with the wave length of light to be emitted.

3. A light analysis apparatus having relatively fixed axes for the incident and dispersed light, and comprising a plurality of cooperating prisms each capable of relative rotary adjusting movement so that said prisms may be placed in various symmetrical positions relative to said axes, to arrange them for employing light of different wave lengths.

4. A light analysis apparatus comprising relatively fixed optical systems for the incident and dispersed light and an interposed dispersing prism system comprising two or more prismatic elements having a simultaneous relative movement in accordance with the variation of the wave length of light to be employed.

5. A light analysis apparatus having optical systems for the incident and dispersed light with relatively fixed axes and a dispersing system for said optical systems comprising, exclusively, a plurality of refracting prism elements each arranged for relative adjusting movement so that they may be placed in various symmetrical positions relative to said axes, in accordance with the wave length of light to be employed.

6. A light analysis apparatus having optical systems for the incident and dispersed light with relatively fixed axes, a dispersing system interposed between said optical systems comprising a plurality of prism elements arranged to refract the light directly from the axis of the optical system for said incident light to the axis of the optical system for said dispersed light and operating means for adjusting said prism elements equally in opposite directions relative to one another to place them in various symmetrical positions relative to said axes, in accordance with the wave length to be employed.

7. A light analysis apparatus having optical systems for the incident and dispersed light with relatively fixed axes, a dispersing system interposed between said optical systems comprising a plurality of prism elements arranged to refract the light directly from the axis of the optical system for said incident light to the axis of the optical system for said dispersed light and means for simultaneously rotating said prisms in opposite directions for employing light of different wave lengths.

8. In a light analysis apparatus, the combination with optical systems for the incident and dispersed light of relatively high aperture and fixed axes, of a dispersing system comprising a plurality of relatively small prisms of birefracting material each arranged for relative rotation so that they may be placed in various symmetrical position relative to said axes, for employing light of different wave lengths.

9. In a light analysis apparatus, the combination with optical systems for the incident and dispersed light having relatively fixed axes, of a dispersing prism system comprising relatively movable prism elements arranged to provide equal path lengths of right and left hand birefracting material in all positions of adjustment.

10. In a light analysis apparatus, the combination with optical systems for the incident and dispersed light having relatively fixed axes, of a dispersing prism system comprising cooperating prisms providing equal path lengths of right and left hand birefracting material and means for effecting relative adjustment of said prisms to place them in various symmetrical positions relative to said axes to employ light of different wave lengths.

11. In a light analysis apparatus, the combination of separate optical systems for the incident and dispersed light having relatively fixed axes and a dispersing system interposed between said optical systems comprising prism elements providing equal path lengths of right and left hand birefracting material for refracting light directly from the axis of one of said optical systems to that of the other of said systems and means for effecting simultaneous rotary adjustment of said prism elements in opposite directions for employing light of different wave lengths.

12. In a light analysis apparatus, the combination with optical systems for the incident and dispersed light having relatively fixed axes, of a dispersing prism system comprising prism elements of birefracting material arranged for simultaneous pivotal movement in opposite directions and having the optical axes of the material of the respective elements arranged to lie parallel with the axes of said optical systems, respectively, when said elements are arranged to transmit light of a wave length corresponding to the center of the wave length range of the instrument.

13. In a light analysis apparatus, the combination with optical systems for the incident and dispersed light having relatively fixed axes, of a dispersing prism system comprising prisms of right and left hand birefracting material arranged for simultaneous pivotal movement in opposite directions and having the optical axes of the material of the respective elements arranged to lie parallel with the axes of said optical systems, respectively, in the central position of said prism elements.

14. In a light analysis apparatus, the combination with optical systems for the incident and dispersed light having relatively fixed axes, of a light dispersing system comprising cooperating prism elements each rotatable about an axis thereof for employing light of different wave lengths and means for simultaneously rotating said prism elements provided with a wave length scale.

15. In a light analysis apparatus, the combination with optical systems for the incident and dispersed light having relatively fixed axes and comprising objectives provided with means for effecting focusing adjustment thereof having indicating means including a wave length scale, of a light dispersing system comprising relatively rotatable prism elements and means for effecting relative movement thereof provided with indicating means having a wave length scale corresponding to the wave length scales of said objective focusing means.

16. In a light analysis apparatus, the combination of optical systems for the incident and dispersed light having relatively fixed axes and comprising adjustable slit means and objectives having a focusing adjustment, a dispersing prism system comprising prism elements having relative equal and opposite rotary movements in accordance with the wave length of the light to be employed, and means for adjusting said objectives and said prisms provided respectively with indicating wave length scales.

17. In a light analysis apparatus, the combination of a light dispersing system comprising symmetrically arranged cooperating prism elements, a casing in which said elements are mounted for simultaneous rotary adjustment in accordance with the wave length to be employed, optical systems for the incident and dispersed light comprising tubes fixed to said casing, objective lens mounts adjustable longitudinally in said tubes, adjustable slit means at the outer ends of said tubes and means for adjusting said objectives and rotating said prisms provided respectively with corresponding indicating wave length scales.

18. In a light analysis apparatus, the combination of a casing, prism mounts rotatable in said casing and provided with seats, prism elements detachably mounted in said seats, optical systems for the incident and dispersed light carried by said casing in relatively fixed relation and a single means for simultaneously rotating said prism mounts to position said prism elements in accordance with the wave length to be employed.

19. In a light analysis apparatus, the combination of a casing, prism tables rotatable in said casing, shoulder means on said tables providing prism seats, straps for detachably holding prisms on said seats, optical systems for the incident and dispersed light fixed to said casing on opposite sides of said prism tables and means for simultaneously rotating said tables in opposite directions to position prism elements carried thereby in accordance with the wave length to be employed.

20. In a light analysis apparatus, the combination of a casing, prism mounts rotatable in said casing, a slide in said casing, adjustable connections between said slide and prism mounts, optical systems for the incident and dispersed light comprising tubes fixed to said casing and having relatively fixed axes and a screw carried by said casing for moving said slide to rotatably adjust said prisms for refracting light of a desired wave length from one of said axes to the other.

21. A light analysis apparatus, comprising supporting means, pivot screws on said means, a prism table pivotally supported between said screws and having a part adjustable toward and from the pivotal axis, an adjusting screw provided with an indicating wave length scale, a nut on said supporting means through which said adjusting screw may be advanced and retracted and means for transmitting the motion of said adjusting screw to said prism table part.

22. A light analysis apparatus, comprising supporting means, pivot screws thereon, a prism table pivotally supported between said screws and having an arm projecting transversely of the pivotal axis, a slide on said supporting means, a connection between said slide and arm, an adjusting screw provided with an indicating wave length scale, and a nut on said supporting means in which said adjusting screw is rotatable to adjust said slide and prism table.

23. A light analysis apparatus, comprising supporting means, pivot screws thereon, a prism table pivotally supported between said screws and having a radially projecting arm, socket means adjustable on said arm toward and from the pivotal axis, a slide on said supporting means provided with socket means, a pin having its ends engaged in the socket means of said arm and slide, respectively, a nut on said supporting means and a screw adjustable in said nut for moving said slide.

24. A light analysis apparatus, comprising a casing provided with pairs of pivot screws, a prism table pivotally supported between each pair of pivot screws and having a radially projecting arm, a slide in said casing, means connecting said slide with each of said arms, a nut on said casing, a screw rotatable in said nut and provided with an indicating wave length scale and spring means connecting said casing with each of said prism tables for maintaining the latter in cooperating relation with said slide and the slide in contact with said screw.

25. A light analysis apparatus comprising a casing, a prism table in said casing, center screws in said casing for pivotally supporting said prism table, one of said screws being accessible exteriorly of said casing for adjusting the same and means provided with an indicating wave length scale for effecting pivotal adjustment of said prism table.

26. A light analysis apparatus comprising a casing, a bracket in said casing, spaced center screws carried respectively by said bracket and casing, said casing screw being accessible exteriorly of the casing for adjusting the same, a cylindrical part pivotally carried between said screws and a prism table on said part.

27. A light analysis apparatus comprising a casing, a bracket in said casing, spaced center screws carried respectively by said bracket and casing, said casing screw being accessible exteriorly of the casing for adjusting the same, a cylindrical part pivotally carried between said screws, a prism table on said part and means on said table for detachably locating the prism thereon in predetermined position.

28. In a light analysis apparatus, the combination of a casing, prism elements pivotally mounted in said casing and a unitary assembly for pivotally adjusting both of said elements concomitantly, comprising a housing on the wall of said casing, a nut carried by said housing opposite an opening in said casing, a screw rotatable in said nut and provided with an indicating wave length scale in said housing and means in said casing for connecting said screw and prism elements for adjusting the latter by rotation of said screw.

29. In a light analysis apparatus, the combination of a casing having the form substantially of a hollow trapezoidal prism, refracting prism elements mounted in said casing for simultaneous pivotal adjustment in opposite directions, transmission tubes for the incident and dispersed light fixed to the inclined sides, respectively, of said casing, a nut on said casing, a screw rotatable in said nut and connected with said prism elements for adjusting the same and a wave length scale for indicating the adjustment of said screw.

30. A light analysis apparatus having a light transmission tube provided with a diaphragm, guides on said diaphragm, spaced parallel slides in said guides, cooperating slit edges connected with said slides, an adjusting screw for moving one of said slides, a lever pivoted on said diaphragm and connections between the ends of said lever and the respective slides for effecting simultaneous adjustment thereof and of said slit edges by the adjustment of said screw.

31. A light analysis apparatus, having a light transmission tube provided with a diaphragm, guides on said diaphragm, slides in said guides, cooperating slit edges connected with said slides, spring means for moving said slides to bring said slit edges together, a lever pivoted on said diaphragm having its ends connected with the respective slides for effecting simultaneous opposite movement thereof, and a screw provided with indicating means for moving said slides to separate said slit edges.

32. In a light analysis apparatus, a pair of relatively adjustable prisms of right and left hand birefracting material, respectively, and arranged with their optical axes coplanar and symmetrical with respect to the traversing beam of light, a casing enclosing and protecting said prisms, means provided with a wave length scale for adjusting said prisms, tubes for the incident and dispersed light secured to said casing with relatively fixed axes, objectives adjustable in said tubes, means for adjusting said objectives provided with wave length scales, and adjustable slit means for each of said tubes.

33. In a prism analysis apparatus, the combination of a casing of substantially trapezoidal prism shape, a pair of prisms pivotally mounted in said casing for simultaneous adjustment in opposite directions, a nut on said casing, a screw rotatable in said nut provided with an indicating wave length scale, means connecting said screw with said prism elements for simultaneously adjusting the same, tubes secured to the inclined sides of said casing with relatively fixed axes, slides adjacent said tubes, an objective carried by each of said slides and having a focusing adjustment in the corresponding tube, rack and pinion means for adjusting said slides, indicating means comprising a wave length scale for each of said rack and pinion means and adjustable slit mechanism for each of said tubes.

34. A light analysis apparatus embodying light receiving and light emitting optical systems arranged with their axes at a fixed angle to each other, and an analyzing system arranged therebetween consisting of two symmetrically arranged prisms of optically active material, one being dextro-rotary and the other laevo-rotary, pivoted on parallel transverse axes, and means for simultaneously rotating said prisms equally in opposite directions about said axes.

35. A light analysis apparatus embodying light receiving and light emitting optical systems arranged with their axes at a fixed angle to each other, and an analyzing system arranged therebetween consisting of two symmetrically arranged prisms of optically active material, one being dextro-rotary and the other laevo-rotary, pivoted on parallel transverse axes, and means for simultaneously rotating said prisms equally in opposite directions about said axes, said two prisms being so arranged that when they are adjusted for the shortest wave length within their range, the outer faces of the prisms are respectively normal to the axes of the light receiving and light emitting optical systems.

36. A light analysis apparatus embodying light receiving and light emitting optical systems arranged with their axes at a fixed angle to each other, and an analyzing system arranged therebetween consisting of two symmetrically arranged prisms of optically active material, one being dextro-rotary and the other laevo-rotary, pivoted on parallel transverse axes, and means for simultaneously rotating said prisms equally in opposite directions about said axes, the optical axes of the material of the prisms being so located that when the prisms are adjusted to the central portion of their spectral range, the light within the prisms is passing substantially parallel to said optical axes.

HENRY F. KURTZ.